(12) United States Patent
Hopton et al.

(10) Patent No.: US 6,523,857 B1
(45) Date of Patent: Feb. 25, 2003

(54) REINFORCING MEMBER FOR INTERFITTING CHANNELS

(75) Inventors: Gregory W. Hopton, Novi, MI (US); Mark Stuligross, Orion, MI (US); Randy Stratman, Waterford, MI (US)

(73) Assignee: Sika Corporation, Lyndhurst, NJ (US)

( * ) Notice: Subject to any disclaimer, the term of this patent is extended or adjusted under 35 U.S.C. 154(b) by 0 days.

(21) Appl. No.: 09/609,418

(22) Filed: Jul. 5, 2000

(51) Int. Cl.⁷ .............................................. B60R 21/13
(52) U.S. Cl. ......................... 280/756; 403/28; 403/281
(58) Field of Search ............................ 280/756; 403/28, 403/274, 281, 282

(56) References Cited

U.S. PATENT DOCUMENTS 5,806,915 A    9/1998  Takabatake ................. 296/187
5,890,738 A  * 4/1999  Heiner et al. ............... 280/756
6,092,864 A    7/2000  Wycech et al. ............. 296/204

FOREIGN PATENT DOCUMENTS

GB            1437352     *  5/1976   .................. 403/28

\* cited by examiner

Primary Examiner—Eric Culbreth
(74) Attorney, Agent, or Firm—Hovey Williams LLP

(57) ABSTRACT

A reinforcing assembly for use with roll bars adapted to be mounted to motor vehicles such as an automobile. The reinforcing assembly includes a heat-expandable synthetic resin reinforcing member and a retainer configured to attach the member to the interior of a two-piece telescopically interfitting tubular roll bar construction. Upon heating, the reinforcing member expands to form a seal between the two roll bar tube sections thereby providing sound-reduction and stability of the roll bar assembly.

28 Claims, 3 Drawing Sheets

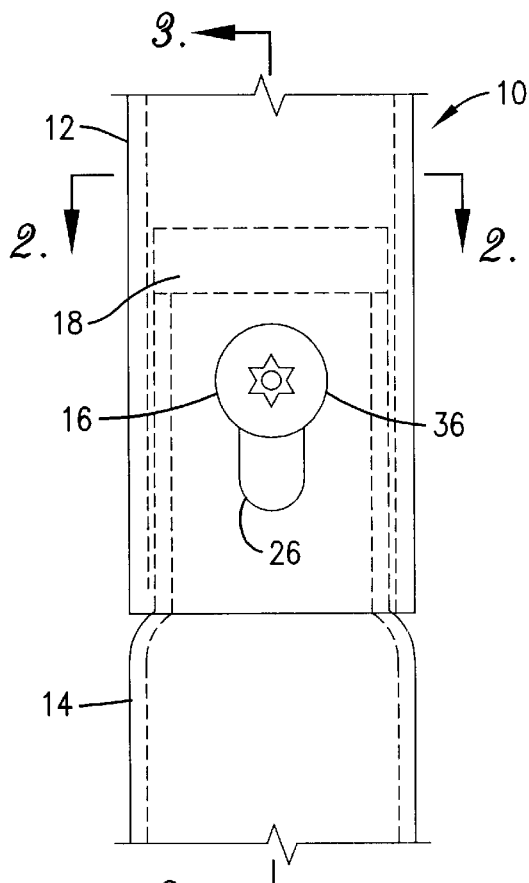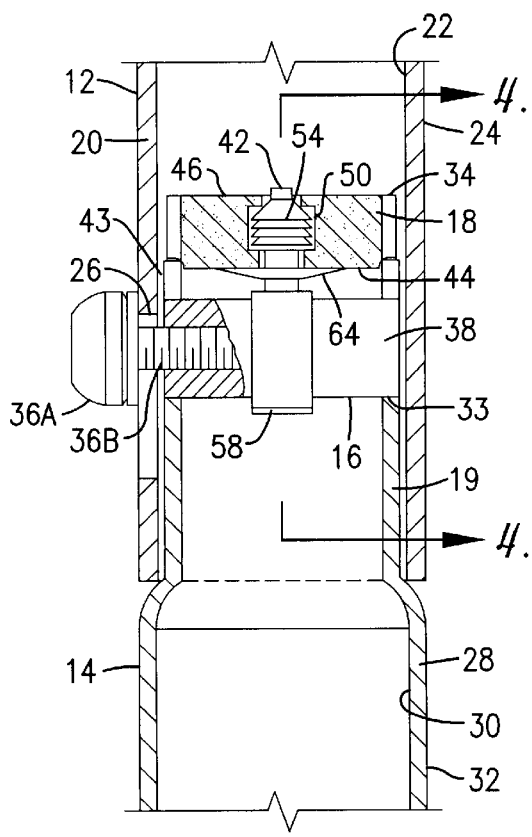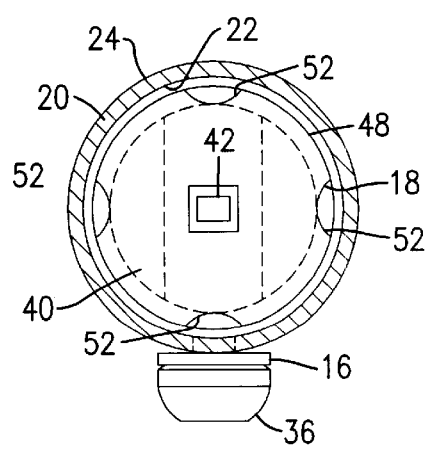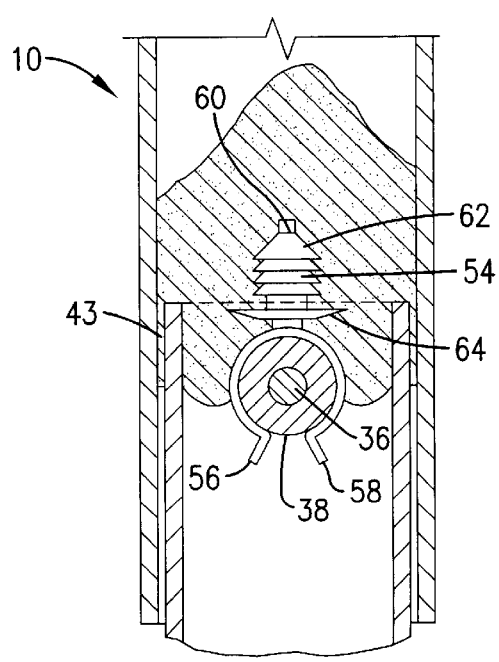
Fig. 1.
Fig. 2.
Fig. 3.
Fig. 4.

REINFORCING MEMBER FOR INTERFITTING CHANNELS

BACKGROUND OF THE INVENTION

1. Field of the Invention

The present invention relates to a reinforcing member for interfitting channels. In particular, the invention relates to a heat-expandable reinforcing assembly that creates a seal between two tube sections of a motor vehicle roll bar for noise reduction and reinforcement of the joint between the tube sections.

2. Description of the Prior Art

Roll bars, commonly used on motor vehicles to prevent injury to the motor vehicle operator in the event the vehicle is overturned, generally include a welded tubular construction alone or in combination with a two-piece telescopically interfitted tubular construction wherein the two pieces are held together by means of a bolt or similar fastening means. In use, the fastener may become loose or may fall out of the roll bar assembly causing the two roll bar sections to bang against one another thereby creating an annoyance to the motor vehicle operator and, more importantly, creating a hazard in that the noise of the two sections rattling against one another may prevent the motor vehicle operator from hearing emergency vehicles, car horns, or other auditory warning signals. Accordingly, there is an unsolved need in the state of art for a roll bar reinforcing assembly that provides stabilization of the roll bar sections, reduces noise associated with the banging together of the roll bar sections, and is easy and economical to install from both a labor and material standpoint.

SUMMARY OF THE INVENTION

The present invention solves the prior art problems discussed above and provides a distinct advance in the state of the art. In particular, the reinforcing member hereof enables reinforcement of a two piece roll bar for a motor vehicle thereby providing sound reduction as well as advantageously enabling finishing liquids such as anti-rust coatings to penetrate and flow through the inside of the roll bar.

The preferred embodiment includes a tubular construction comprising a pair of separate, telescopically interfitted tubular components that cooperatively present a joint therebetween as well as a reinforcing assembly that is operatively located within the interfitted components and proximal the joint. The reinforcing assembly includes a body of heat-expandable synthetic resin material that increases in volume upon heating in order to provide a seal adjacent the joint. When heated, the body engages the tubular components thereby providing a sound-reducing seal which bonds together with metal components and adds strength in the area of the expanded resin material.

The preferred reinforcing assembly is adapted to be located within a pair of telescopically interfitted tubular components in order to join and seal the joint therebetween. The preferred reinforcing assembly comprises a body of heat-expandable synthetic resin material configured for location within the tubular components adjacent the joint and a retainer coupled with the body in order to position the body within the tubular components prior to heat expansion of the body. The retainer serves to locate the synthetic resin material in proximately to the joint and preferably maintains the resin in a desired, axially centered position prior to expansion. Alternatively, the synthetic resin of the reinforcing assembly may be shaped by molding or the like into a complemental shape for receipt within the tubular construction adjacent the joint so that the two tubular components serve to aid in locating the material for expansion at the joint.

BRIEF DESCRIPTION OF THE DRAWINGS

FIG. 1 is a side elevational view of the two-piece tubular construction of the present invention showing the inner tube section in phantom lines;

FIG. 2 is top plan view of the tubular construction of FIG. 1 taken along line 2—2;

FIG. 3 is a side elevational view of the tubular construction of FIG. 1 taken along line 3—3 showing the reinforcing assembly and cross connector assembly prior to heat expansion in cross-section;

FIG. 4 is a side elevational view in cross-section showing the reinforcing assembly and cross connector after heat expansion;

DETAILED DESCRIPTION OF THE PREFERRED EMBODIMENTS

Figure 5:
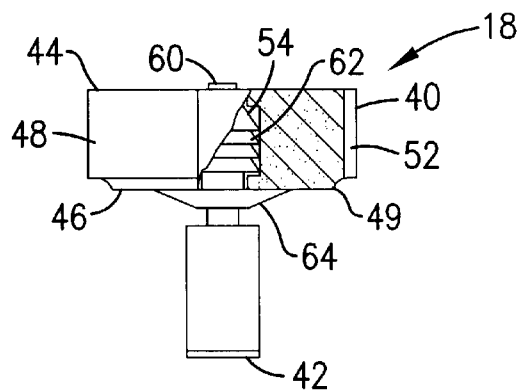
FIG. 5 is a side elevational view of the reinforcing assembly in partial cross-section.
Figure 6:
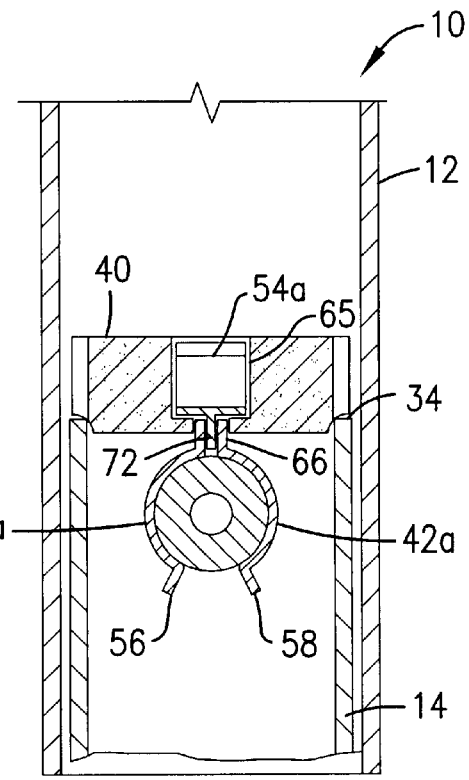
FIG. 6 is a side elevational view in cross-section showing the second preferred reinforcing assembly prior to heat expansion.
Figure 7:
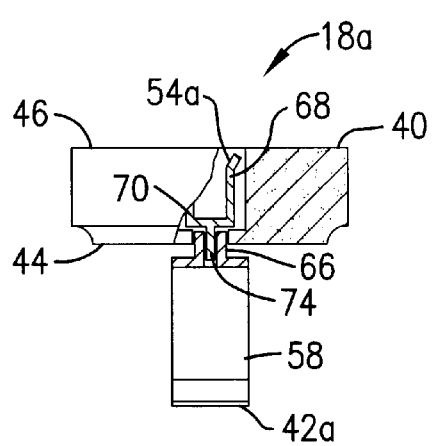
FIG. 7 is a side elevational view of the reinforcing assembly of FIG. 6 in partial cross-section.
Figure 8:
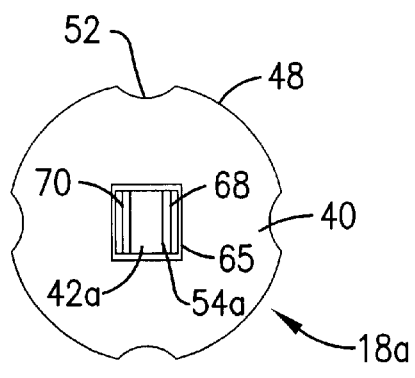
FIG. 8 is a top plan view of the reinforcing assembly of FIG. 7.
Figure 9:
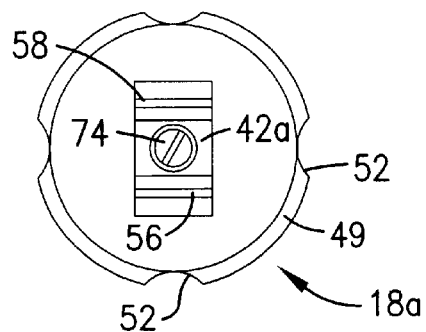
FIG. 9 is a bottom plan view of the reinforcing assembly of FIG. 7.

Referring now to the drawings, FIG. 1 illustrates a preferred roll bar connection assembly 10 in accordance with the present invention. Broadly, roll bar is made up of two elongated, interfitted tubes which cooperatively define a generally U-shaped roll bar attached to a vehicle such as an automobile. The assembly 10 is between the ends of the overall roll bar, and includes a first tube section 12, a second tube section 14, a cross connector assembly 16 and a reinforcing assembly 18 which is normally hidden from view. In more detail, the second tube section 14 presents a reduced diameter section 19 that telescopically interfits within the larger first tube section 12. First tube section 12 includes a sidewall 20 having an inner face 22, an outer face 24, and an aperture 26 extending through sidewall 20 from inner face 22 to outer face 24. Second tube section 14 likewise includes a sidewall 28 having diametrically opposed holes 29 therethrough, an inner face 30, an outer face 32, and an internal end section 34, the sidewall 28 surrounding a through bore 33.

Cross connector assembly 16 includes a bolt 36 having an enlarged head 36A and a threaded shank 36B and an internally threaded sleeve 38 configured to receive the shank 36B of bolt 36 therein. Sleeve 38 is received within bore 33 and secured to sidewall 28 so that sleeve 38 extends transversely across the interior of sidewall 28 and is positioned in registry with aperture 26.

Reinforcing assembly 18 includes a reinforcing member 40 formed of heat-expandable synthetic resin material and a retainer 42. Reinforcing member 40 is generally disc-shaped prior to expansion and includes first face 44, opposed second face 46 and circumferential rim 48. The reinforcing member 40 thus presents a height between the first face 44 and the second face 46 in an unexpanded condition as shown in FIGS. 3 and 5 of about preferably 4 to 8 cm to a typical roll bar construction, although this amount will vary depending on the particular application and size of the tube sections. Reinforcing member 40 further includes a central perforation 50 as well as grooves 52 formed about the rim 48 of member 40 and extending between first and second faces, 44 and 46. The member 40 thus presents a scalloped edge configuration. In addition, the reinforcing member 40 includes a narrowed neck 49 of a reduced diameter relative to rim 48 and which projects below end margin 34 and partially extends into tube section 14 to aid in locating the reinforcing member 40 as shown in FIG. 3.

One particularly preferred composition for use as member 40 is commercialized under the name SIKAREINFORCER (Sika Corporation, Madison Heights, Mich.). In more detail, the most preferred material for use in reinforcing member 40 comprises: from about 20–30% by weight of a styrene-butadiene-styrene (SBS) block co-polymer (e.g., Fina Clear 530®); from about 5–20% by weight of a polystyrene (e.g., Fina Crystal 500® and Fina Crystal 535®); from about 30–45% by weight of a bisphenol A-based liquid epoxy resin (e.g. Araldite 6010® and Epon 71®); from about 0.5–5% by weight of a pigment such as carbon black; up to about 5% by weight butadiene acrylonitrile rubber (Nipol 1411); from about 1–10% by weight hydrated amorphous silica (HiSil 233); from about 10–20% by weight glass microspheres (Scotchlite S60); from about 0.1–5% by weight of a blowing agent such as azodicarbonamide (e.g., Celogen AZ 765®, Celogen AZ 754A®, and Celogen AZ 130®); from about 0.1–5% by weight of a catalyst such as N, N, dimethyl phenyl urea (U405); from about 0.1–5% by weight of a curing agent such as sulfur or dicyandiamide (DDA10); and up to about 5% by weight of a "kicker" such as zinc oxide to lower the blowing temperature, with all percents by weight being based upon the total weight of the material taken as 100% by weight.

A particularly preferred composition of the member 40 comprises about 12.94% polystyrene, about 23.22% SBS block copolymer, about 0.57% carbon black, about 1.90% butadiene acrylonitrile rubber, about 4.28% hydrated amorphous silica, about 38.07% bisphenol A-based liquid epoxy resin, about 14.75% glass microspheres, about 0.46% zinc oxide, about 2.85% dicyandiamide, about 0.38% N,N dimethyl phenyl urea, and about 0.57% azodicarbonamide. In certain applications where increased compressive strength and reduced foaming and expansion is desired, the foregoing may be adjusted such that the polystyrene is reduced to about 12.63%, the SBS block copolymer is reduced to about 22.59%, and the butadiene acrylonitrile rubber is increased to about 2.85%.

The member 40 can be formed by mixing the SBS block co-polymer with a small portion (about 1/40th of the total amount) of the bisphenol A-based liquid epoxy resin in a heated mixer until the temperature of the mixer reaches from about 240–260° F. (the temperature of the mixture within the mixer is at least about 175° F.), and the mixture is substantially homogeneous, at which time the polystyrene is added to the mixer and mixing is continued. After the polystyrene is substantially mixed with the SBS block co-polymer/epoxy resin mixture, the remainder of the bisphenol A-based epoxy resin is slowly added to the mixer, stopping and starting the mixer as necessary, with the ingredients being thoroughly mixed to obtain a substantially homogeneous mixture. The desired amount of this mixture is placed in a heated mixer (set at a temperature of about 250° F.) and mixing is commenced. While mixing, the carbon black and rubber are added to the mixer and mixing is stopped once a homogeneous mixture is obtained within the mixer. Either the silica or glass microspheres is added to the mixer, and mixing is resumed and continued until the mixture is homogeneous. This step is repeated, adding the other of the silica or glass microspheres.

The temperature of the mixer is then set to a temperature below 160° F., the blowing agent(s), catalyst(s), kicker, and curing agent(s) are added, and mixing is resumed and continued only until the mixture is homogeneous. The resulting mixture is then preferably extruded into strands (at an extruder temperature of 170–180° F. and screw rotation speeds of about 400 rpm) and cut into pellets. The pellets are then injection molded at a temperature of about 180–200° F. using injection molding equipment designed to form the desired shape of the member 40 to be attached to the retainer 42 or otherwise molded into a configuration for positioning adjacent the joint 43 between the first tube section 12 and second tube section 14.

Retainer 42 includes an attachment member 54, a first leg 56 and a second leg 58. Attachment member 54 has a standard 60, a series of aligned skirts 62, and base 64 as shown in section in FIGS. 4 and 5. Skirts 62 are integral with standard 60 and project outwardly therefrom in axially-spaced alignment. Standard 60 projects from base 64. Attachment member 54 extends through first face 44 into perforation 50 so that base 64 contacts first face 44 and the tip of standard 60 is generally flush with second face 46. Legs 56 and 58 project outwardly from base 64 in a generally opposite direction from standard 60 and resiliently receive sleeve 38 for locking engagement of reinforcing assembly 18 with sleeve 38.

In use, the reinforcing assembly 18 is positioned adjacent the internal end margin 34 of the second tube section 14 prior to intermitting of the first tube section 12 and second tube section 14. The retainer 42 is preferably coupled to the sleeve 38 as shown in FIG. 3. The circumferential rim 48 serves to locate the reinforcing member 40 in a substantially axially centered position. The retainer 42 serves to maintain the reinforcing assembly 18 in proper position notwithstanding movement or tumbling of the roll bar connection assembly 10. The bolt 36 is tightened against the sidewall 20 of the first tube section 12. The axially oriented, circumferentially spaced groves 52 and the gap between the circumferential rim 48 and the interface 22 of the first tube section 12 help to ensure that any rust protecting composition received within the first tube section 12 is permitted to drain past the reinforcing member 40 and thoroughly coat the assembly 10. When the vehicle to which the roll bar assembly 10 is secured is painted, it is typically passed to a bake oven. Upon heating of the roll bar connection assembly 10 in a bake oven to a temperature of at least 300° F., and preferably about 325° F. for a period of about 10 minutes, the reinforcing member 40 will activate, to melt, foam and expand. The base 64 aids in directing the expanding reinforcing member 40 and resisting excessive sag thereof during melting. The resulting reinforced roll bar connection assembly 10 is then allowed to cool to ambient temperature.

In another preferred embodiment of the reinforcing assembly 18a illustrated in FIGS. 6–9, wherein like parts are numbered in the same manner as the embodiment shown in FIGS. 1–5, a two-piece retainer 42a is depicted which includes attachment member 54a seated within a cup-shaped stepped bore 65 with a central opening in the base of member 40, a first leg 56, a second leg 58 and a projecting tubular shank 66. Attachment member 54a is formed of synthetic resin material such as nylon having a higher melting point than that used in the material of member 40 and includes a first arm 68, a second arm 70, a post 72, and a fastener 74 formed on the end of post 72 and configured to lockingly engage post 72 and shank 66. Arms 68 and 70 project outwardly from post 72 which extends through bore 65 until the tops of arms 68 and 70 are generally flush with second face 46. Post 72 snap-fits within shank 66 and fastener 74 lockingly engages shaft 66 to prevent longitudinal shifting of post 72 relative to shank 66. However, post 72 is permitted to swivel within the shank 66, thus permitted relative rotational movement of the reinforcing member 40 relative to retainer 42a relative to the attachment member 54a. Legs 56 and 58 project outwardly from shank 66 in a generally opposite direction from arms 68 and 70 and resiliently receive sleeve 38 for securing coupling the reinforcing assembly 18 to the sleeve 38. By permitting the reinforcing member 40 to rotate relative to the sleeve 38, alignment and installation of the reinforcing assembly 18 is greatly facilitated.

Figure 10:
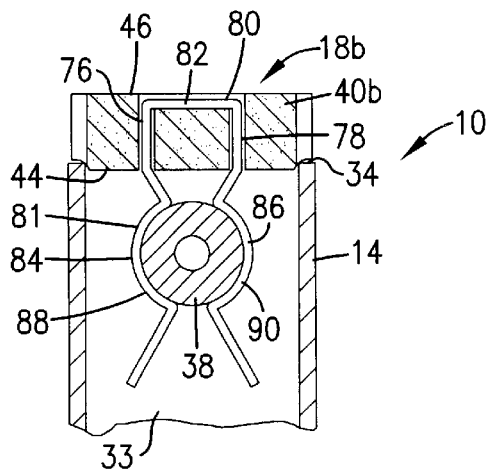
FIG. 10 is a side elevational view in cross-section of a third embodiment of the preferred reinforcing assembly prior to heat expansion with the upper tube section removed for clarity.
Figure 11:
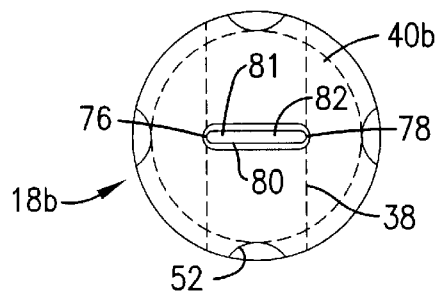
FIG. 11 is a top plan view of the reinforcing assembly of FIG. 10.

A third preferred embodiment of the reinforcing assembly 18b is shown in FIGS. 10 and 11 which is of a simplified two-piece construction for use with the roll bar connection assembly 10. In this embodiment, reinforcing member 40b presents two apertures 76 and 78 that extend through member 40b from first face 44 to second face 46. Second face 46 includes a depression 80 extending between the apertures 76 and 78 and configured to receive attachment member 81. Attachment member 81 includes a formed wire bight 82, first leg 84, and a second leg 86. Attachment member 81 couples with second face 46 of reinforcing member 40b by inserting leg 84 into first aperture 76 and inserting second leg 86 into second aperture 78 in such a manner that legs 84 and 86 extend through reinforcing member 40b and project outwardly from first face 44. Depression 80 therefore receives bight 82 in locking engagement. Legs 84 and 86 each include an arcuate section 88, 90 configured to receive sleeve 38 for locking engagement of reinforcing assembly 18b with sleeve 38.

Figure 12:
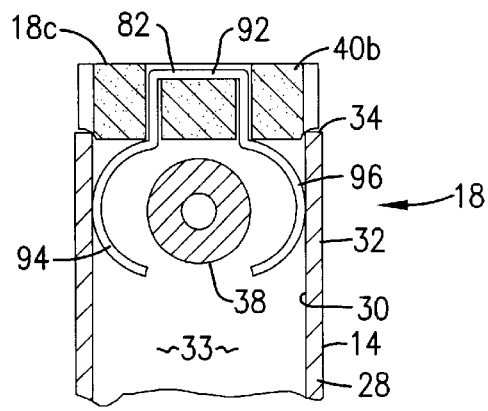
FIG. 12 is a side elevational view in cross-section of a fourth embodiment of the preferred reinforcing assembly prior to heat expansion with the upper tube section removed for clarity.
Figure 13:
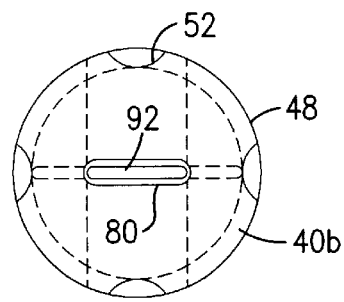
FIG. 13 is a top plan view of the reinforcing assembly of FIG. 12.

FIGS. 12 and 13 illustrate a fourth preferred embodiment of the reinforcing member 18c similar to that of FIGS. 10 and 11 except that the attachment member 92 presents legs 94 and 96 which are generally arcuate and configured to engage the inner face 30 of sidewall 28. Thus, the legs 94 and 96 of the reinforcing member 18c serve to frictionally engage the inner face 30 of the second tube section 14 but do not normally engage the sleeve 38 except when the member 40 moves longitudinally away therefrom.

Figure 14:
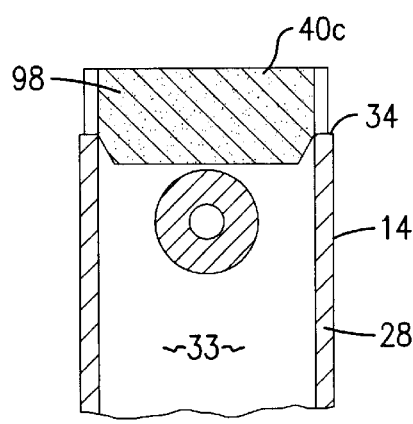
FIG. 14 is a side elevational view in cross-section of a fifth embodiment of the preferred reinforcing assembly prior to heat expansion.
Figure 15:
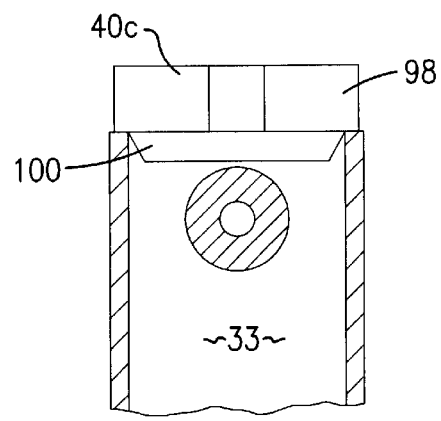
FIG. 15 is a side elevational view of the reinforcing assembly of FIG. 14.

Finally, in another preferred embodiment, as shown in FIGS. 14 and 15, reinforcing member 40 is molded into a configuration complemental to the second, inner tube section 14 whereby the member 40c includes an enlarged upper body 98 sized to rest upon the end margin 34 of the second tube section 14 and a narrowed neck 100 configured for insertion into the bore 33. The complemental and interfitting relationship between the member 40c and the second tube section 14 permits the bulk of the thermally expandable reinforcing material of the body 98 of member 40c to flow into the joint for receipt both above and below the margin 34 and in the space between the reduced diameter section 19 and the interface 22 of the first tube section 12. In addition, if desired, the reinforcing member 40c may be temporarily coupled with internal end section 34 of tube section 14 by affixing first face 44 to the margin 34 with glue or the like, or the first face 44 may be provided with a transversely or diametrically extending groove complemental to the outer surface of sleeve 38 whereby the reinforcing member may be supported on the sleeve 38.

In use, reinforcing assembly 18 is coupled with sleeve 38 within second tube section 14. Second tube section 14 is telescopically interfitted with first tube section 12 and secured in place by inserting bolt 36 into sleeve 38 thereby forming a generally U-shaped roll bar which is then coupled to a motor vehicle. The motor vehicle may be sprayed or dipped with an anti-rust solution, paint, or any other finishing solution. The liquid flows through tube sections 12 and 14 past reinforcing assembly 18 by way of grooves 52 on reinforcing member 40 and past the gap between the rim 48 and the inner face 22 of the sidewall 20 of the first tube section 12, thereby thoroughly coating inner faces 22 and 30 of sidewalls 20 and 28. The motor vehicle is then baked at a predetermined temperature sufficient to allow curing of the liquid thereby resulting in the expansion of reinforcing member 40 so that a seal is formed between tube sections 12 and 14 as shown in FIG. 3. The resulting expanded material of the member 40 bonds to the sleeve 38 as well as to the tubes 12 and 14, thus creating not only a substantially reinforced connection between the first and second tube sections, but also creates a seal which provides significant sound-reducing capabilities and prevents rattling of tube sections 12 and 14 against one another in the event bolt 36 becomes loose or is freed from sleeve 38 during operation of the motor vehicle. As may be seen in FIG. 4, during expansion of the material of the reinforcing member 40, the material flows into the junction between the tubes 12 and 14 to provide a strong, rigid, sealing connection.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus or method not materially departing from but outside the literal scope of the invention as set out in the following claims.

We claim:
1. A tubular construction comprising:
a pair of separate, telescopically interfitted tubular components cooperatively presenting a joint therebetween, said components each having an apertured sidewall, with said apertures being in general alignment, there being a cross connector assembly located at least partially within said apertures for coupling together of said tubular components; and a reinforcing assembly operatively located within said interfitted components and proximal to said joint, said reinforcing assembly including a body of heat-expanded synthetic resin material, said body bonding to said tubular components thereby providing a reinforced, sound-reducing seal adjacent said joint.

2. The construction of claim 1, said cross connector assembly comprising a bolt.

3. The construction of claim 2, said cross connector assembly further comprising an annular internally-threaded sleeve affixed within the inner one of said tubular components in general alignment with the aperture in the sidewall of the outer one of said tubular components and configured to receive said bolt.

4. The construction of claim 1, said reinforcing assembly including a retainer affixed to said synthetic resin material for attachment to said cross connector assembly.

5. The construction of claim 4, said retainer being selected from the group consisting of synthetic resin or wire.

6. The construction of claim 4, said retainer including an attachment member and a pair of legs, wherein said attachment member extends through said retainer and said legs extend outwardly from said retainer for attachment to said cross connector assembly.

7. The construction of claim 6, said attachment member comprising a standard presenting a base and a plurality of axially spaced skirts.

8. The construction of claim 6, said attachment member comprising a pair of projecting arms projecting in a generally opposite direction from said legs.

9. The construction of claim 6, said attachment member comprising a bight embedded within said body.

10. The construction of claim 9, said body including a plurality of circumferentially spaced grooves formed therein whereby said body presents a generally scalloped edge configuration.

11. A tubular construction comprising:
a pair of separate, telescopically interfitted tubular components, a first tube section of said pair of tubular components having an outer face and a second tube section of said pair of tubular components having an inner face, the circumference of said outer face of said first tube section being less than the circumference of said inner face of said second tube section thereby cooperatively presenting a joint between said inner face and said outer face; and
a reinforcing assembly operatively located within at least said second tube section of said pair of intermitted components, said reinforcing assembly including a body of heat-expanded synthetic resin material including a blowing agent for expanding said reinforcing assembly upon attainment of a blowing temperature, said body bonding to said tubular components and at least a part of said body being located in said joint between said first and second tube sections thereby providing a reinforced, sound-reducing seal adjacents said joint.

12. The construction of claim 11, said tubular construction comprising a roll bar for a motor vehicle.

13. The reinforcing assembly of claim 11, wherein said heat-expanded synthetic resin material forming said body includes a curing agent.

14. The reinforcing assembly of claim 11, wherein upon expansion of said body, said reinforcing assembly expands whereby the reinforced, sound-reducing seal substantially spans said inner face of said second tube section.

15. A reinforcing assembly adapted to be located within a pair of telescopically interfitted tubular components in order to seal the joint therebetween, said reinforcing assembly comprising:
a generally disc-shaped body of heat expandable synthetic resin material configured for location within said tubular components adjacent said joint; and
a retainer coupled with said body for positioning the body within said tubular components prior to heat expansion of the body.

16. The reinforcing assembly of claim 15, said body including a plurality of circumferentially spaced grooves formed therein whereby said body presents a generally scalloped configuration.

17. The reinforcing assembly of claim 15, said tubular components comprising a roll bar for a motor vehicle.

18. A reinforcing assembly adapted to be located within a pair of telescopically interfitted tubular components in order to seal the joint therebetween, said reinforcing assembly comprising:
a body of heat expandable synthetic resin material configured for location within said tubular components adjacent said joint; and
a retainer coupled with said body for positioning the body within said tubular components prior to heat expansion of the body, said retainer being selected from the group consisting of synthetic resin and wire.

19. The reinforcing assembly of claim 18, said retainer including an attachment member and a pair of legs, wherein said attachment member extends through said body and said legs extend outwardly from said retainer.

20. The reinforcing assembly of claim 19, said attachment member comprising a standard presenting a base and a plurality of axially spaced apart skirts.

21. The reinforcing assembly of claim 19, said attachment member comprising a pair of projecting arms projecting in a generally opposite direction from said legs.

22. The reinforcing assembly of claim 19, said attachment member comprising a bight embedded within said body.

23. A reinforcing assembly for reinforcing a motor vehicle roll bar having an internal bore, said assembly comprising:
a body of thermally expansible material adapted for receipt within the bore of the roll bar and presenting a first face and having a perforation; and
a retainer coupled with said body, said retainer including an attachment member and a pair of spaced and opposed legs, wherein said retainer extends through said body and projects from said first face.

24. A reinforcing assembly as set forth in claim 23, said attachment member including a standard received in said perforation and a base in engagement with said first face.

25. A reinforcing assembly as set forth in claim 24, said attachment member including a plurality of axially spaced skirts extending from said standard in engagement with said body.

26. A reinforcing assembly as set forth in claim 23, wherein said attachment member and pair of spaced and opposed legs are integrally formed of wire.

27. A reinforcing assembly as set forth in claim 23, wherein said attachment member includes a pair of arms projecting in a generally opposite direction from said legs and away from said first face.

28. A reinforcing assembly as set forth in claim 23, wherein said attachment member is pivotally coupled to said legs.

* * * * *